US007765466B2

(12) United States Patent  
Kawamura (10) Patent No.: US 7,765,466 B2  
(45) Date of Patent: Jul. 27, 2010

(54) INFORMATION PROCESSING APPARATUS THAT STORES A PLURALITY OF IMAGE DATA ITEMS HAVING DIFFERENT DATA-FORMATS AND COMMUNICATES WITH AN EXTERNAL APPARATUS VIA A NETWORK, AND METHOD THEREFOR

(75) Inventor: Kohei Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/836,217

(22) Filed: May 3, 2004

(65) Prior Publication Data

US 2005/0002590 A1 Jan. 6, 2005

(30) Foreign Application Priority Data

May 20, 2003 (JP) ............................. 2003-142405

(51) Int. Cl.  
*G06F 17/00* (2006.01)  
*G06F 17/20* (2006.01)  
(52) U.S. Cl. ...................................... 715/227; 382/296  
(58) Field of Classification Search ................ 715/509, 715/511, 516, 227  
See application file for complete search history.

(56) References Cited

U.S. PATENT DOCUMENTS

| 3,676,856 | A | * | 7/1972 | Manly | ........................ 715/531 |
| 5,018,083 | A | * | 5/1991 | Watanabe et al. | ........... 715/517 |
| 5,764,817 | A | * | 6/1998 | Suzuki et al. | ............... 382/302 |
| 5,887,193 | A | * | 3/1999 | Takahashi et al. | .............. 710/8 |
| 6,111,586 | A | * | 8/2000 | Ikeda et al. | .................. 345/619 |
| 6,427,032 | B1 | * | 7/2002 | Irons et al. | .................. 382/306 |
| 6,469,737 | B1 | * | 10/2002 | Igarashi et al. | ........... 348/211.3 |

(Continued)

FOREIGN PATENT DOCUMENTS

EP 1 164 503 12/2001

(Continued)

OTHER PUBLICATIONS

Chen et al; "A Flexible Image rterieval and multimedia Presentation mangement System for Multimedia databases";ACm; 2001.*

(Continued)

*Primary Examiner*—Doug Hutton  
*Assistant Examiner*—James J Debrow  
(74) *Attorney, Agent, or Firm*—Fitzpatrick, Cella, Harper & Scinto (57) ABSTRACT

An information processing method for providing a communication terminal with a service. When editing in a lump of a plurality of held data to which the services are to be applied is received an instruction from the communication terminal, data capable of undergoing the accepted editing is automatically selected from the held data and the selected data is edited. With regard to data automatically judged to be incapable of undergoing the accepted editing, information that reports exclusion of this data from editing is transmitted to the communication terminal and is displayed thereby. That is, when plural items of held data are edited simultaneously, data not suited to this editing is excluded automatically, thereby enhancing user convenience in terms of operation. In addition, the fact that data not suited to editing has not been edited is clearly indicated to the user to prevent miss-recognition by the user.

5 Claims, 7 Drawing Sheets

U.S. PATENT DOCUMENTS

| | | | |
|---|---|---|---|
| 6,587,637 B2* | 7/2003 | Nagasaka et al. | 386/69 |
| 6,693,635 B1* | 2/2004 | Yokomizo | 345/428 |
| 6,741,977 B1* | 5/2004 | Nagaya et al. | 707/1 |
| 6,810,441 B1 | 10/2004 | Habuto et al. | |
| 6,883,140 B1* | 4/2005 | Acker et al. | 715/730 |
| 6,952,281 B1* | 10/2005 | Irons et al. | 358/1.15 |
| 7,042,583 B1* | 5/2006 | Wilkins et al. | 358/1.15 |
| 7,369,164 B2* | 5/2008 | Parulski et al. | 348/231.99 |
| 2001/0042086 A1 | 11/2001 | Ueda et al. | 707/527 |
| 2003/0063304 A1* | 4/2003 | Satomi et al. | 358/1.11 |
| 2003/0065807 A1 | 4/2003 | Satomi | |
| 2004/0205286 A1* | 10/2004 | Bryant et al. | 711/1 |
| 2005/0052469 A1* | 3/2005 | Crosby et al. | 345/619 |

FOREIGN PATENT DOCUMENTS

| | | |
|---|---|---|
| EP | 1 298 910 | 4/2003 |
| JP | 2001-92704 | 4/2001 |
| JP | 2003-23566 | 1/2003 |
| JP | 2003-111008 | 4/2003 |
| JP | 2003-142405 | 5/2003 |

OTHER PUBLICATIONS

Sarvas et al.,"MobShare: Controlle dnad Immediate Sharing of Mobile Images", Oct. 2004, ACM, pp. 724-731.*

Carson, Wayne,"A Survey of Computer Graphics Image Encoding and Storage Formats", 1991, Computer Graphica, pp. 67-75.*

Byong et al.,"Image-Based Modeling and Photo Editing" ACM, 2001, pp. 433-442.*

Barrett et al.,"Object-Based Image Editing", ACM, 2002, pp. 777-784.*

Villard, Lionel, "Authoring Transformations by Direct Manipulation for Adaptable Multimedia Presentations", ACM, 2001, pp. 125-134.*

Rodden et al. "How Do People Manage Their Digital Photographs", ACM, 2003, pp. 409-416.*

Saund et al."Perceptually-Supported Image Editing of Text and Graphics", 2003, ACM, pp. 183-192.*

Matsuoka, "CD and DVD Backup: From Extreme Music CD Creation Techniques to Writable DVD-Based System Backup, and DivX and DVD-VR/+VR Applications", PC Japan, SoftBank Publishing Inc., Japan Mar. 1, 2003; vol. 8, No. 3, Item 72.

Complete Save Edition: VAIO Perfect Travel Shooting, VAIO Style, Sony Magazines Inc., Japan, Aug. 1, 1999; vol. 9, No. 35., Item 74.

Yanagiya, Download Files that Must be Readable: Mastering File Formats and Extensions, ASCII Net J, ASCII Corporation, Japan, Nov. 10, 2000, vol. 5, Item 35.

* cited by examiner

| ITEM | TYPE | |
|---|---|---|
| IMAGE ID | NUMERICAL TYPE | ~401 |
| IMAGE-TYPE CODE | NUMERICAL TYPE | ~402 |
| ROTATION ANGLE | NUMERICAL TYPE | ~403 |

FIG. 6

INFORMATION PROCESSING APPARATUS THAT STORES A PLURALITY OF IMAGE DATA ITEMS HAVING DIFFERENT DATA-FORMATS AND COMMUNICATES WITH AN EXTERNAL APPARATUS VIA A NETWORK, AND METHOD THEREFOR

FIELD OF THE INVENTION

This information relates to an information processing system, apparatus and method for holding electronic information, which is possessed by a user, in a server connected using a communication environment such as the Internet, and supplying the held electronic information to the user or to other users, a storage medium on which a program that implements the method is stored in a manner readable by the information processing apparatus, and the program per se.

BACKGROUND OF THE INVENTION

As background, a network photo service is available as one type of service for providing information with communication via a network. This service keeps image data, which a user has captured by an image input device, in a storage area of a network server and enables the user to view the image data when desired. The provider that makes this network photo service available will be referred to as a "photo site" below. A plurality of items of image data stored at the photo site are collected together and held in a unit referred to as an album. There are also cases where it is possible to retain the image data in the album in both still- and moving-image formats.

There are instances where a user wishes to edit a plurality of images collectively at the same time in an album having a mixture of image data in both the still- and moving-image formats.

Editing such as rotation is suited to still-image data but is not suited to moving-image data. Hence there are occasions where it desired that such editing not be applied to moving-image data. In such cases the prior-art practice when rotation-type editing is to be performed requires the user to select only the still-image data from the album and then specify the editing thereof. This is a time-consuming task. Further, if moving-image data is accidentally selected and specified for this editing together with still-image data, then error processing will be executed on the grounds that the data includes moving-image data not suited to editing and therefore no data, including the still-image data, will be edited.

SUMMARY OF THE INVENTION

Accordingly, an object of the present invention is to provide an information processing system, apparatus, and method which, when a plurality of items of held data are to be edited simultaneously, automatically exclude data not suited to such editing, thereby enhancing user convenience in terms of operation, and clearly indicate to the user the fact that data not suited to editing has not been edited, and to further provide a storage medium on which a program for implementing the image processing method is stored in a form readable by the image processing apparatus, as well as the program itself.

By way of example, when a plurality of images are edited simultaneously in an album in which the still and moving images are mixed, the still images or moving images are excluded automatically from images to be edited and then it is indicated that the excluded images have been edited, in a case where the editing is not suited to the still or moving images.

According to the present invention, the foregoing object is attained by providing a information processing apparatus for accepting commands of processing applied to data, comprising: holding unit adapted to hold a table in which the data and formats of the data are correlated; receiving unit adapted to receive, from another information processing apparatus via a network, a command to execute the processing in a lump with regard to a plurality of items of the data having different data formats; and processing executing means for referring to the held table and executing the processing with regard to data of a prescribed format among the plurality of items of data being a target of the processing.

Further, according to the present invention, the foregoing object is attained by providing an information processing method for accepting commands of processing applied to data, comprising the steps of: holding a table in which the data and formats of the data are correlated; receiving, from another information processing apparatus via a network, a command to execute the processing in a lump with regard to a plurality of items of the data having different data formats; and referring to the held table and executing the processing with regard to data of a prescribed format among the plurality of items of data being a target of the processing.

The method further comprises a step of exercising control in such a manner that the other information processing apparatus is notified via the network of the result of processing the data. The method further comprises a step of exercising control in such a manner that if the processing was not executed with respect to the data, the other information processing apparatus is so notified. The formats of the data include moving-image data and still-image data formats. The processing includes processing for performing editing so as to rotate the data and cause it to be displayed on a monitor of the other information processing apparatus, or at least one of processing for enlarging/reducing size of the data, processing for adjusting image quality of the data, processing for synthesizing the data, processing for halting voice playback of the data and processing for performing editing so as to play back the data in reverse.

Further, according to the present invention, the foregoing object is attained by providing a program for implementing the information processing method, and a storage medium on which the program is stored in a manner readable by the information processing apparatus.

Further, according to the present invention, the foregoing object is attained by providing an information processing system comprising a first information processing apparatus for accepting commands of processing applied to data, and a second information processing apparatus for commanding execution of the processing, wherein the first information processing apparatus includes: holding unit adapted to hold a table in which the data and formats of the data are correlated; receiving unit adapted to receive, from the second information processing apparatus via a network, a command to execute the processing in a lump with regard to a plurality of items of the data having different data formats; processing executing unit adapted to refer to the held table and execute the processing with regard to data of a prescribed format among the plurality of items of data being a target of the processing; and control unit adapted to exercise control in such a manner that page information relating to result of processing of the data is transmitted to the second information processing apparatus via the network; and the second information processing apparatus has display unit adapted to analyze the page information transmitted and display the result of processing the data on a monitor.

According to the present invention, as described above, when a plurality of items of held data are to be edited simultaneously, data not suited to such editing is excluded automatically, thereby enhancing user convenience in terms of operation.

In addition, when a plurality of items of held data are to be edited simultaneously, the fact that data not suited to editing has not been edited is clearly indicated to the user, thereby making it possible to prevent miss-recognition by the user.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will now be described with reference to the accompanying drawings.

<Overview of Configuration and Operation of a Service Providing System According to this Embodiment>

Figure 1:
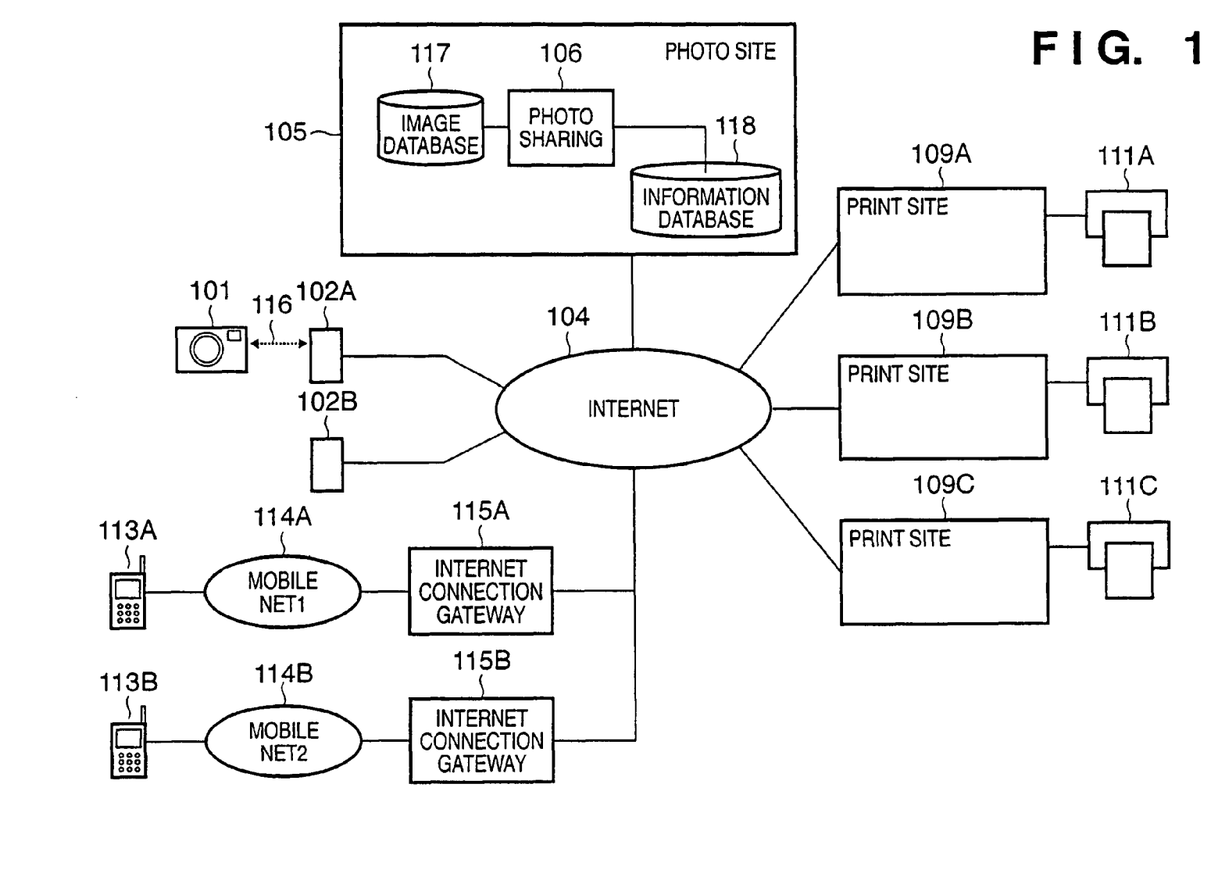
FIG. 1 is a diagram illustrating the configuration of an overall system illustrating the connection relationship among a user who possesses images, a photo site that holds the images, and print sites for printing the images in an embodiment of the present invention.

FIG. 1 is a diagram illustrating the overall configuration of a system for providing a service according to this embodiment.

The system includes an image input device 101 such as a digital still camera that is capable of taking a still image and recording it as image data, and a digital movie camera that is capable of shooting a moving image and recording it as moving-image data. The image input device 101 converts an optical image, which consists of image information, to an electric signal, subjects the signal to prescribed image processing and records and plays back the processed data as digital information. The system further includes a user personal computer (abbreviated to "user PC" below) 102A, and a data transfer interface 116 for transferring captured image data between the image input device 101 and the user PC 102A. The data transfer interface 116 may be a wired interface typified by a USB or IEEE 1394, or a wireless interface typified by IrDA or Bluetooth. Image data that has been captured by the image input device 101 and stored as digital information is transferred via the data transfer interface 116 to a storage area of an information storage unit typified by a hard-disk drive of the user PC 102A.

With regard to image data transfer from the image input device 101 to the user PC 102A, there are cases where image data that has been stored in the information storage unit in the image input device 101 is transferred collectively in response to an instruction from an operating system or special-purpose software that has been installed in the user PC 102A, and there are cases where the operating system or special-purpose software of the user PC 102A acquires a data recording area in an information recording section of the user PC 102A and transfers the image data in response to a transfer command sent from the image input device 101.

(Example of Uploading of Image Data)

Image data that has thus been transferred from the image input device 101 to the user PC 102A is uploaded by a procedure, which is set forth below, to a photo site 105 connected to the Internet 104. A browser that operates at the user PC 102A and has a standard protocol that enables information transfer over the Internet 104 accesses the photo site 105 using the standard protocol, such as the http protocol, and displays information that is linked to multimedia information, such as video and voice, created in a description language such as HTML or XML managed by the server personal computer of the photo site 105. By virtue of this operation, the user PC 102A is capable of receiving a service, which utilizes the Internet 104 as communication infrastructure, provided by the photo site 105.

Next, the image data that has been stored in the information storage area of the user PC 102A is transferred to the photo site 105 in response to a user request from the user PC 102A. (This transfer shall be referred to as "image upload" below.) There are cases where image upload involves having the user operate the user PC 102A to select image data, which is desired to be transferred, using the browser described above, and to transfer the image data in operative association with an image-upload request action, and cases where it involves having the user select image data using special-purpose software for image upload and transfer the image data directly from this special-purpose software for image upload. In either case, image upload is executed based upon a protocol such as http or ftp utilizable on the Internet 104.

A module that executes this series of operations at the photo site 105 is a photo sharing module 106. Whether the image data that has been uploaded is usable data is checked by the photo site 105 using the photo sharing module 106. If it is determined that the data can be utilized, the uploaded image data is stored in an image database 117 and the attribute information thereof is stored in an information database 118. At this stage the photo sharing module 106 notifies the user PC 102A of the fact that the image data has been uploaded normally.

Besides the attribute information of the image data described above, various data such as data constituting user attribute information that has been registered at the photo site 105 and attribute information of a print service provider (abbreviated to "print site" below) that requests print out of uploaded image data are managed in unified fashion in the information database 118. A specified image represented by the image data thus uploaded can be viewed by the user of the user PC 102A via the browser. With regard to such viewing, there are also cases where the uploaded image data is managed as an album with a plurality of images serving as one unit. A information DB 118 is managed by a DB server mentioned thereafter.

(Viewing Album by Browsing User)

The user operates the user PC 102A to access the photo site 105 using a Web browser and notifies the photo site 105 of the designation of an album that allows viewing and of the e-mail address of the browsing user that allows viewing of the album.

The photo site 105 generates a Universal Resource Locator (URL) necessary for viewing the specified album. The URL generates a unique address that indicates the location of the album. The photo site 105 creates e-mail the bears the generated URL and transmits the e-mail to the e-mail address of the browsing user. The browsing user who has received the e-mail operates the browsing user PC 102 or a mobile terminal 113, for example, enters the URL, which is borne by the e-mail, to the Web browser and accesses the photo site 105 via the Internet 104.

Upon receiving access from the PC 102 of the browsing user, the photo site 105 sends back Web data that has been created in a description language such as HTML or XML capable of being reproduced by the Web browser that operates on the PC 102. Accordingly, an album viewing screen is displayed on the monitor of the PC 102 based upon the Web data.

Figure 5:
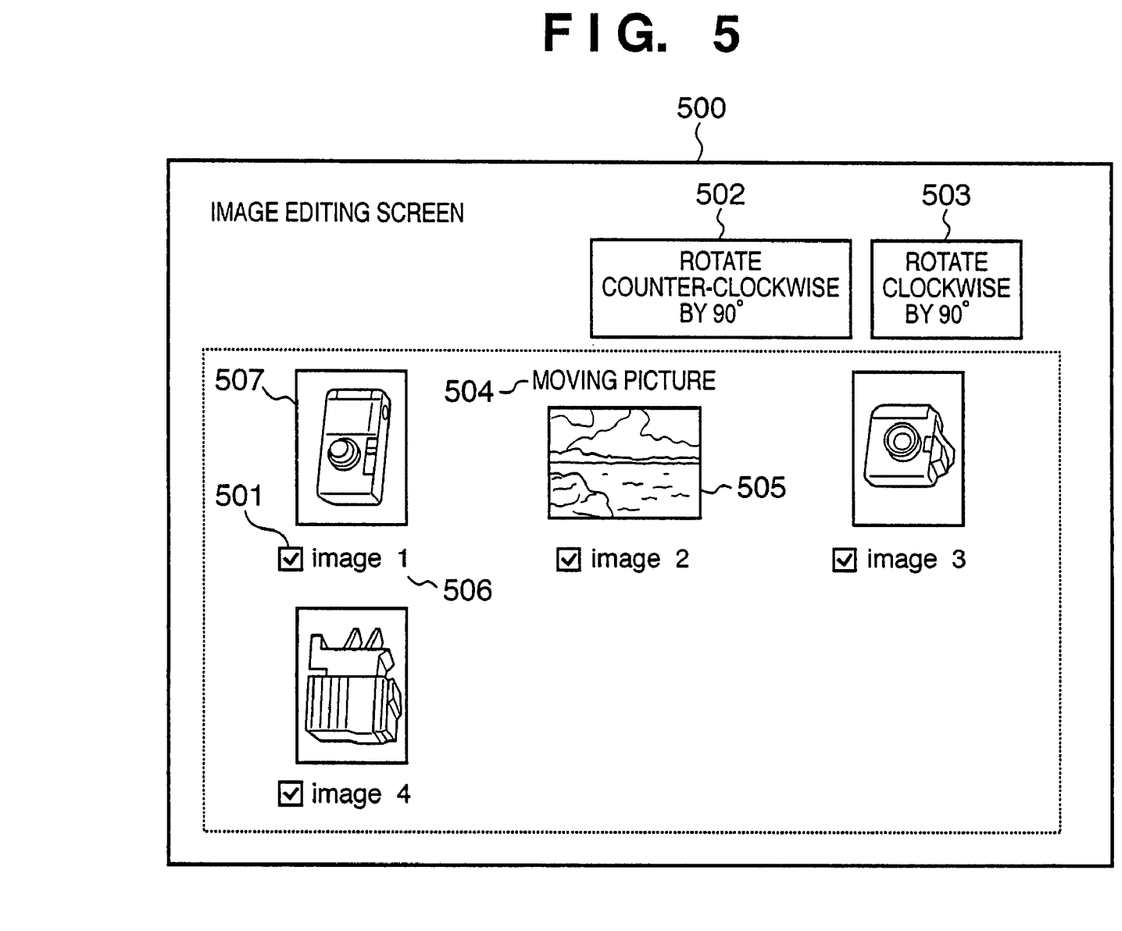
FIG. 5 is a diagram illustrating an example of a screen in a case where a user has rotated all images 90° in the clockwise direction on an image editing screen according to this embodiment.

By way of example, a viewing screen 500 of the kind shown in FIG. 5 is displayed. Image data in a plurality of different formats included in an album is displayed collectively on the viewing screen 500 of FIG. 5. "MOVIE" 504 is a character string indicating that an image displayed therebelow is a moving-image format. In this embodiment, it is assumed that an image 507, etc., above which "MOVIE" 504 is not being displayed is in the still-image format. A "ROTATE COUNTER-CLOCKWISE BY 90°" button 502 and a "ROTATE CLOCKWISE BY 90°" button 503 are buttons for instructing that the image 507 whose check box 501 has been checked is to be displayed upon rotating it by 90° counter-clockwise or clockwise from its present attitude.

<Example of Structure of Photo Site According to this Embodiment>

Figure 2:
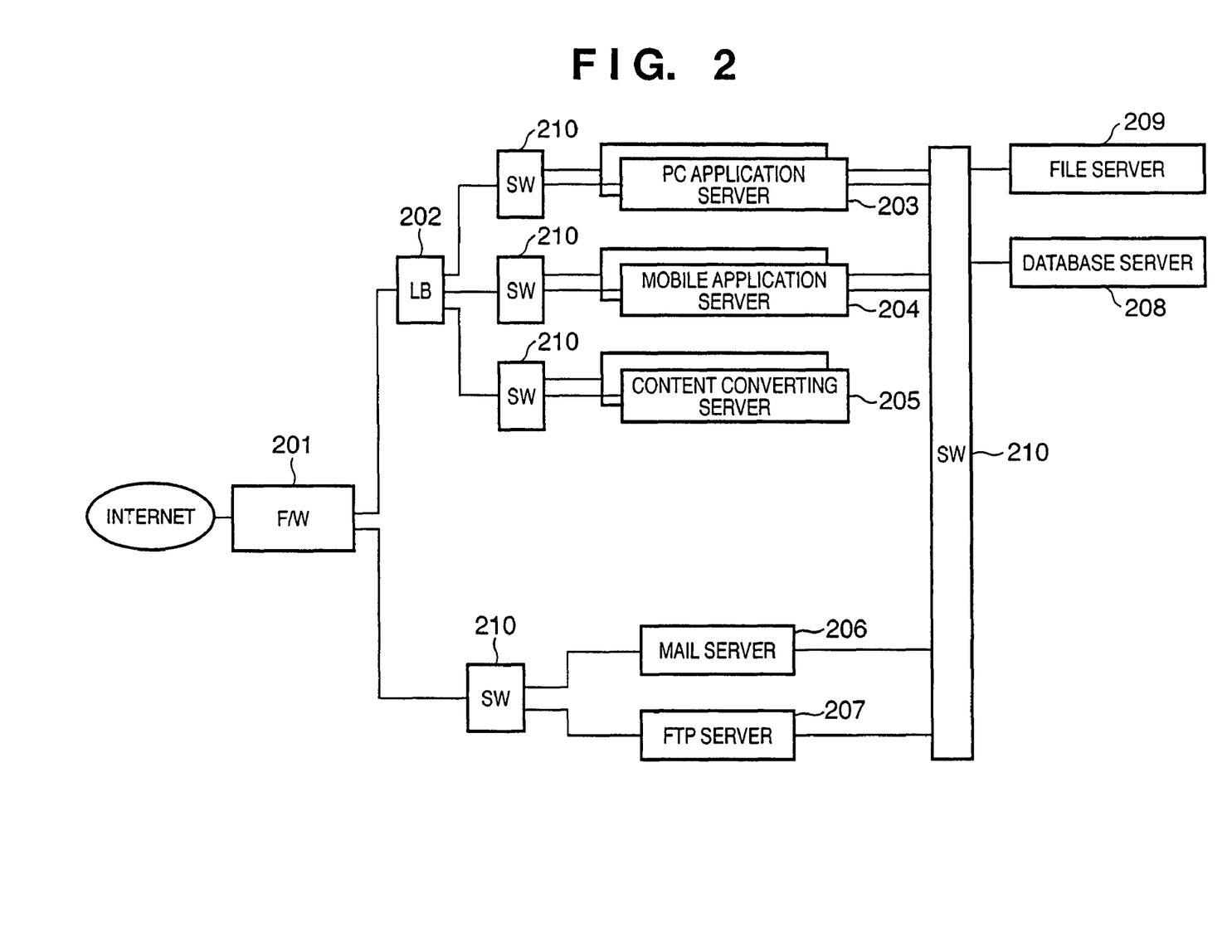
FIG. 2 is a diagram illustrating an example of the structure of a photo site according to this embodiment.

FIG. 2 is a diagram illustrating an example of the structure of the photo site 105 according to this embodiment.

The photo site 105 mainly comprises a firewall (F/W) 201, a load balancer (LB) 202, PC and mobile application servers 203, 204, respectively, a content converting server 205, a mail server 206, an FTP server 207, a database (DB) server 208, a file server 209, and an Ethernet (registered trademark) switch (SW) 210.

The firewall 201 at the photo site 105 functions to block intrusions and attacks from the outside and is used to safely operate the group of servers on the intranet within the photo site 105.

The photo site 105 primarily has the PC application server 203, which provides the PC 102 with service, and the mobile application server 204, which provides the mobile terminal 113 with service. These application servers function as WWW servers. The application servers 203, 204 acquire image information and user information in association with the database server 208 and generate a page at an appropriate time.

Figure 3:
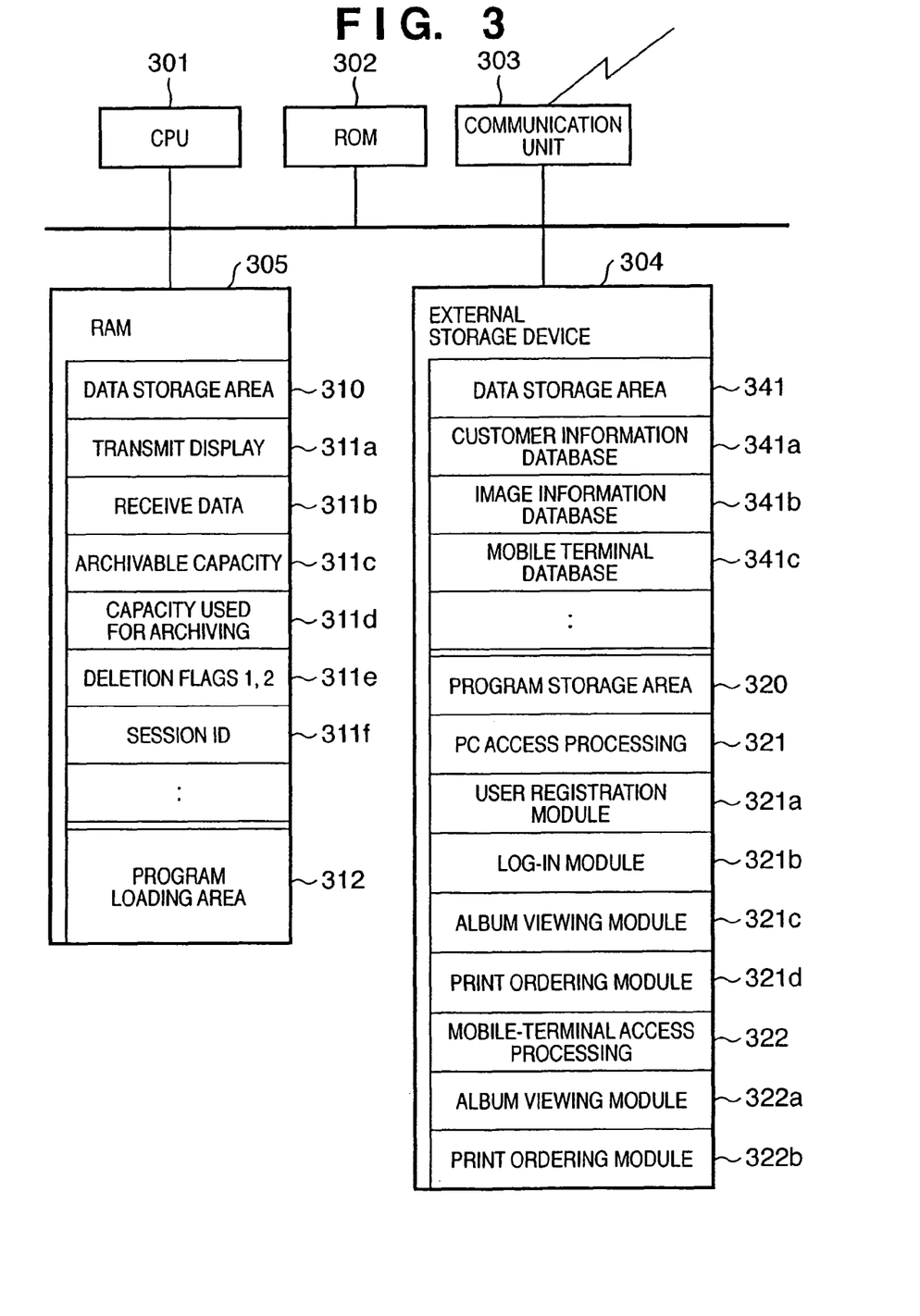
FIG. 3 is a diagram illustrating an example of the hardware implementation of a photo site according to this embodiment.

The application server 203 and the mobile application server 204 have a photo sharing module 106 and perform various processing mentioned thereafter by CPU 301 executing the photo sharing module.

The load balancer 202 is a load dispersing device and has a load dispersing function for assigning access to the photo site 105 to a plurality of servers in the intranet. In addition, the load balancer 202 has a function for acquiring terminal information about the source of the access and discriminating whether a request is a view request from the mobile terminal 113 or a view request from the PC 102. In accordance with the result of discrimination, the load balancer 202 assigns the view request from the PC 102 to the PC application server 203 and assigns the view request from the mobile terminal 113 to the mobile application server 204 via the content converting server 205.

The PC application server 203 has a web page for a network image storing service that supports access from the PC 102. Further, the PC application server 203 provides a user web page for every user that enables each user to utilize an image acceptance service that makes it possible for each user to view images, set a password and send invitation mail for viewing.

In response to an indication from the PC application server 203 or mobile application server 204, the mail server 206 transmits e-mail for confirming service registration and e-mail for reporting information necessary for viewing of images.

An image from a user is received by the FTP server 207 through the ftp protocol. Once image data has been received, the data is stored in the file server 209 that functions as main storage.

<Example of Hardware Implementation of Photo Site According to this Embodiment>

FIG. 3 is a diagram illustrating an example of the hardware implementation of a server unit constructing the photo site 105 according to this embodiment. It should be noted that FIG. 3 is centred on a controller and does not illustrate input/output devices.

The photo site includes a CPU (Central Processing Unit) 301, which is the control unit of FIG. 1, for controlling the overall server unit constructing the photo site 105. A program and parameters that do not require modification have been stored in a ROM (Read-Only Memory) 302. A RAM (Random-Access Memory) 305 is a storage area that stores programs and data temporarily and comprises a data storage area 310 and a program loading area 312.

A system program such as an operating system and printer driver or an application program provided by a user or the like is loaded in the program loading area 312 from an external storage device 304 and is executed by the CPU 301.

The following areas used in this embodiment are reserved in the data storage area 310: a transmit display 311a created in order to be provided to the communication terminal of the user; receive data 311b received from the communication terminal of the user; image-data achievable capacity 311c used in order to check whether image data can be held; hold capacity 311d presently being used to hold image data; an area 311e for storing a flag used when viewing image data from the mobile terminal 113; and a session ID 311f.

The external storage device 304 includes a fixed hard disk or memory card or portable removable media such as a floppy (registered trademark) disk, a compact disk (CD) or other optical disks, a magnetic or optical card, an IC card or a memory card. The external storage device 304 comprises a data storage area 341 and a program storage area 342.

Stored in the data storage area 341 are a customer information database 341a for managing information concerning a user who has requested holding, an image information database 341b for managing image information that has been held, and a mobile terminal database 341c that manages information for a mobile terminal.

A program loaded into the program loading area 312 of the RAM 305 and executed is stored in a program storage area 320 (the program may be executed directly by a memory card or the like). Though not illustrated in FIG. 3, a system program such as an operating system of BIOS used in this embodiment also is stored in the program storage area 320. In FIG. 3, the following are stored in the program storage area 320 as a program 321 for PC access processing: a user registration module 321*a*, a login module 321*b*, an album viewing module 321*c* and a print ordering module 321*d*. An album viewing module 322*a* is further stored as a program 322 for mobile-terminal access processing.

In the example of the hardware configuration of the photo site described above, the hardware is illustrated in the form of a single apparatus. However, the arrangement may be in the form of a system in which each server of FIG. 2 is an independent device and all of the devices are connected by a LAN (Local Area Network). Further, storage devices, particularly the external storage device 304, may be dispersed as a plurality of devices.

<Example of Database Structure>

Here only an image-data information management table that indicates the image data used in this embodiment is illustrated. In addition, tables such as a customer information table, image information table, moving-image information table, print information table and mobile-terminal information tables and image data such as still images, moving images and thumbnail images that are content per se also are stored in the databases 117, 118, though these are not described here in detail. In this embodiment, image-type codes are stored in the image-data information table, though this does not impose a limitation upon the invention.

Figure 4:
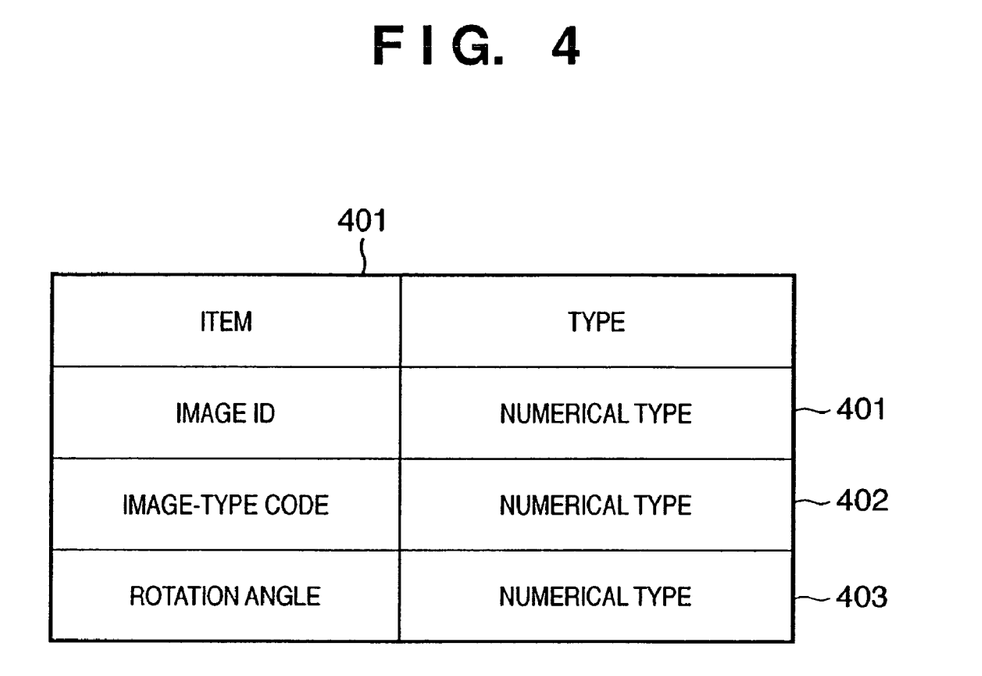
FIG. 4 is a diagram illustrating an image-data information management table, which is required in the database of a photo site, for storing image type information and rotation angle information in this embodiment.

FIG. 4 illustrates an example of the structure of an image-data information management table 400. It should be noted that only data used in describing this embodiment is illustrated and that other data is not shown.

The image-data information management table 400 in the database 118 managed by the photo site 105 is created, one record per image of the image data, and is registered and managed in the database 118. Using an image ID 401 as a key, the image-data information management table 400 stores an image-type code 402, which is the result of numerically encoding the type of image, and a rotation angle 403. If editing relating to a rotation angle has been requested, the rotation angle of the record of interest is overwritten. With regard to the image-type code 402, "0" signifies still-image data and "1" signifies moving-image data. However, this takes into consideration the general circumstances, and the type and definition of image-type code or editing content do not limit the present invention. Further, the rotation angle 403 need not be an angle per se and may be a code obtained by putting an angle in numerical form.

<Example of Selection when Editing a Plurality of Items of Image Data>

The user operates the PC 102 and uses a browser to cause an album managed by the photo site to be displayed on the image editing screen 500 of FIG. 5. If a request for rotation processing is issued by clicking the "ROTATE CLOCKWISE BY 90°" button 503 with regard to an image to be edited selected, by checking the check box 501, from among a plurality of images in which still and moving images are mixed, then the photo site 105 will search each record of the image-data information management table 400 for a record that matches the image ID 401 using as a key the image ID of each item of image data included in the images to be edited.

If the value of the image-type code 402 of the record to be edited for which a matching image ID has been found as a result of the search is "0", then the value of the rotation angle 403 of the record to be edited is overwritten by +90. Furthermore, with regard to image data having the image ID, the photo site 105 issues a rotation-processing request using the value of the rotation angle 403 of the record to be edited. The photo site 105 creates a thumbnail image based upon the rotated image data, creates Web data in such a manner that this thumbnail image will be displayed by the browser of the user PC 102 and transmits the data to the user PC 102 via the Internet 104.

If the value of the image-type code 402 of the record to be edited is "1", then the photo site 105 does not issue a rotation-processing request with regard to the image data having this image ID and also does not change the value of the rotation angle 403 of the record to be edited. The reason for this is that unlike a still image, a moving image is not suited to rotation processing.

Figure 6:
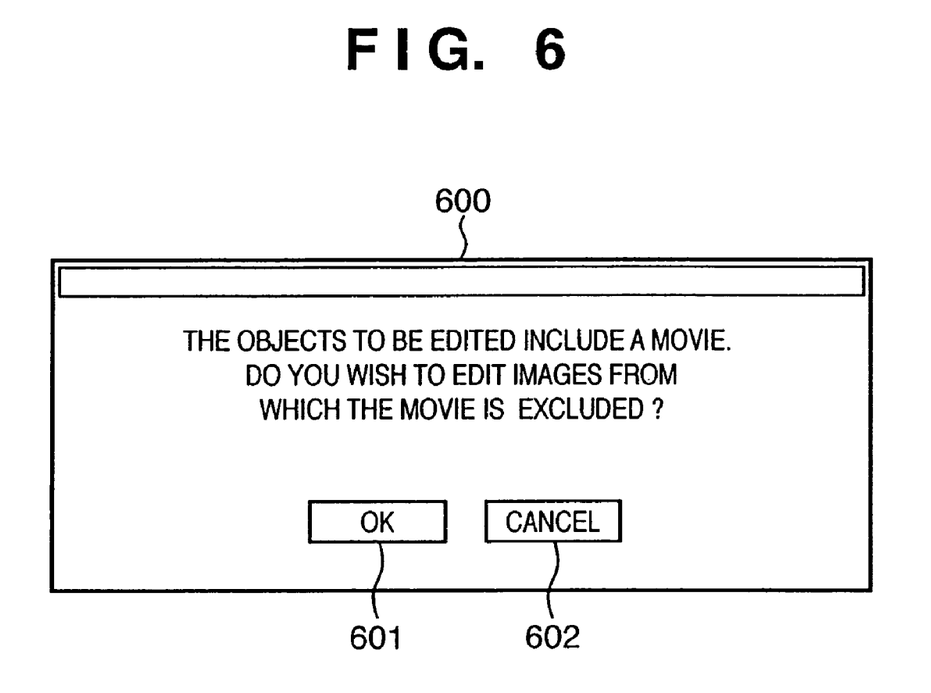
FIG. 6 is a diagram illustrating an example of a screen displaying a warning issued if images to be editing include a moving image when the user has clicked a rotate button on the image editing screen of this embodiment.

In this case, the photo site 105 transmits the Web data, which is for displaying a warning message 600 shown in FIG. 6 on the monitor of the user PC 102, to the user PC 102 via the Internet 104, thereby warning the user of the fact that the moving image is not suited to rotation processing.

It should be noted that the procedure for selecting/excluding moving and still images described above is representative only and does not limit the present invention.

Thus, the format of image data representing moving and still images, etc., and the editing information such as the rotation angle are correlated and managed in the form of a table and the editing of each image is executed based upon the table.

Thereafter, the editing of images in the present system will be described.

Figure 7:
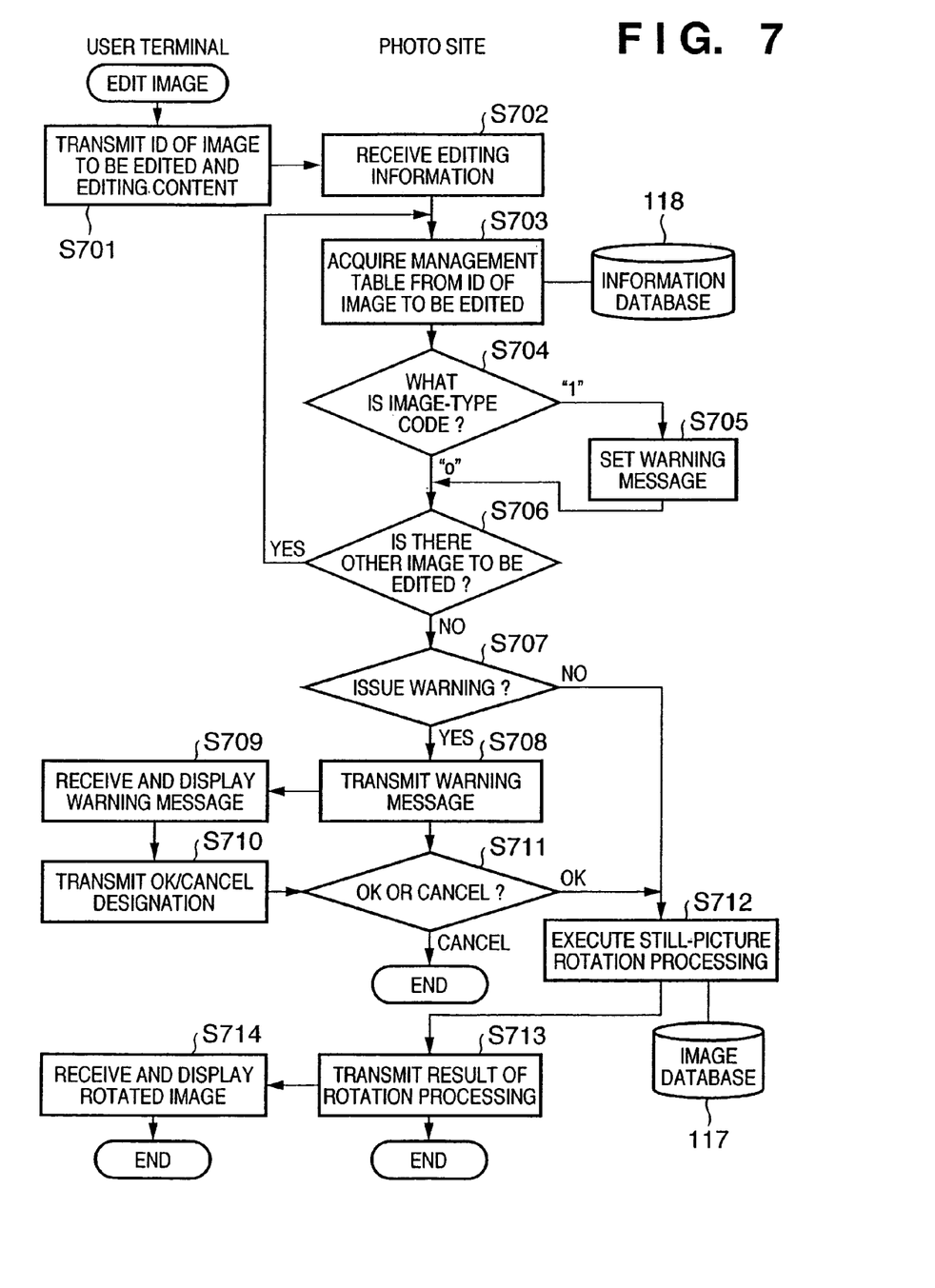
FIG. 7 is a flowchart illustrating an example of the procedure of image editing processing according to this embodiment.

FIG. 7 is a flowchart illustrating an example of the operating procedure of the system according to this embodiment.

If the user operates the user PC 102, displays the image editing screen 500 using the browser and requests editing of image data that has been uploaded to the photo site 105 beforehand, then, at step S701, the user PC 102 transmits a plurality of IDs that identify the image to be edited and the content of editing processing (rotation processing in the example of FIG. 5) which is performed in a lump to a plurality of images to the PC application server 203 in the photo site 105 via the Internet 104. It may be so arranged that information such as a password necessary to perform editing of image data is transmitted as necessary at this time, though this is not shown in the flowchart.

Next, at step S702, the PC application server 203 in the photo site 105 receives the information from the user PC 102 necessary to perform editing and judges whether or not the received information includes any problems. If there is no problem with the received information, then control proceeds to step S703. If the received information has a problem, then the PC application server 203 in the photo site 105 sends back error information such as a warning in response to the edit request from the user PC 102, though this is not illustrated in the flowchart. If the received information has a problem, there are cases where information necessary for editing is missing or where the image of interest does not exist at the information DB 118 in the photo site 105.

The PC application server 203 in the photo site 105 reads the image-data information management table 400 out of the information database 118 at step S703 based upon the image ID of the image of interest received at step S702. This is followed by step S704, at which the PC application server 203 in the photo site 105 determines, based upon the editing content received at step S702, whether the editing request can be executed with respect to the image of interest. In this embodiment, the editing content is rotation processing of the image and the photo site 105 determines, based upon the image-type code 402 in image-data information management table 400, whether the image of interest is a still image ("0"), which can be subjected to rotation processing, or a moving image ("1").

If the image is a moving image, then the PC application server 203 in the photo site 105 prepares a warning message of the kind shown in FIG. 6 at step S705 and control proceeds to step S706. If the image is a still image, on the other hand, then control proceeds to step S706 and the PC application server 203 the photo site 105 determines whether processing of all images of interest designated by the user for editing has been completed. If an image remains, control returns to step S703 and processing is repeated.

If processing of all images of interest has been completed, then it is determined at step S707 whether a moving image that cannot be rotated is present among the plurality of the images of interest designated for editing. If a moving image is present, then the PC application server 203 the photo site 105 transmits the warning message of FIG. 6 to the user PC 102 via the Internet 104 at step S708. If there is no moving image which cannot be rotated, then control proceeds to step S712.

When the user PC 102 receives the error message at step S709, it receives a user input specifying "OK" or "CANCEL" from the screen of FIG. 6 and transmits this to the PC application server 203 in the photo site 105 at step S710. Then, at step S711, the PC application server 203 in the photo site 105 terminates processing without applying editing to the image if "CANCEL" is received, or causes processing to advance to step S711 if "OK" is received.

At step S712, the PC application server 203 in the photo site 105 adds +90 to the rotation angle 403 with regard to the still image that can be edited and executes rotation processing based upon the value of the rotation angle 403. Next, at step S713, the photo site 105 creates Web data for causing the browser of the user PC 102 to display the edited image and transmits the Web data to the user PC 102 via the Internet 104. The user PC 102 receives the edited image at step S714 and updates the image displayed by the browser.

In the embodiment described above, rotation is illustrated as an example of an editing item. However, the effects of the present invention manifest themselves also with regard to all types of image editing such as enlargement/reduction, adjustment of image quality and image synthesis. The same holds true with regard to editing applicable only to moving images, such as muting and reverse playback, as editing items. The effects of the present invention manifest themselves particularly in regard to these items.

Further, the data held in the server is content consisting of still- or moving-image data. However, it goes without saying the data may be other electronic data such as document data or voice data.

Further, in the above embodiment, the present invention has been described specifically taking as an example the editing of an image held at a photo site from a personal computer or mobile terminal. However, the present invention discloses an arrangement in which data that can and cannot undergo editing of content by a user via the Internet can be selected. The invention is not limited to the above-described system nor solely to images and covers all of such data.

For example, the invention is applicable not only to editing but also to printing in similar fashion. That is, when printing a plurality of images in a lump is ordered, the following process can be performed automatically. If an image represents a still image, a print order can be accepted, the print site 109 can be instructed to print the particular image and the data is printed by the printer 111, because the image data have a format enable to be printed. If the image represents a moving image, then a print order cannot be accepted and a warning can be issued to the user, because the image data a format disable to be printed.

Further, it goes without saying that the object of the invention is attained also by supplying a storage medium (or recording medium) on which the program codes of the software for performing the functions of the foregoing embodiment have been recorded to a system or an apparatus, reading the program codes with a computer (e.g., a CPU or MPU) of the system or apparatus from the storage medium, and then executing the program codes. In this case, the program codes read from the storage medium themselves implement the novel functions of the embodiment, and the program codes per se and storage medium storing the program codes constitute the invention. Further, besides the case where the aforesaid functions according to the embodiment are implemented by executing the program codes read by a computer, it goes without saying that the present invention covers a case where an operating system or the like running on the computer performs a part of or the entire process based upon the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process based upon the designation of program codes and implements the function of the above embodiment.

In a case where the present invention is applied to the above-mentioned storage medium, program code that includes the program code corresponding to the flowchart described earlier is stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus that stores a plurality of image data items and communicates with an external apparatus via a network, comprising:
   a processor;
   a transmitting unit constructed to transmit, to the external apparatus, screen information for displaying a plurality of images and a plurality of buttons on a screen of the external apparatus, the plurality of images including images represented by image data items in a still image data format and in a moving image data format, which images are displayed as a list of images with mixing the image data formats on the screen of the external apparatus, the plurality of buttons including a first button instructing to transmit a command for a first editing operation which can be performed on the image data items in the still image data format but cannot be performed on the image data items in the moving image data format or a second button instructing to transmit a command for a second editing operation which can be performed on the image data items in the moving image data format but cannot be performed on the image data items in the still image data format, wherein the first and second buttons are displayed as a list of buttons on the screen of the external apparatus;
   a selection unit constructed to select image data items to be edited of the plurality of image data items stored in the information processing apparatus in response to an operation by a user selecting images of the plurality of images displayed on the screen of the external apparatus, the selected images having image data items including image data items in the still image data format and in the moving image data format with mixing the image data formats;

a receiving unit constructed to receive a command corresponding to a button pushed by the user in response to an operation by the user for pushing the button of the plurality of buttons displayed on the screen of the external apparatus;

a judging unit constructed to judge whether each of the selected image data items is in the still image data format or in the moving image data format;

a determination unit constructed to determine whether or not an editing operation corresponding to the received command can be performed to each of the selected image data items based on the judgment result by said judging unit, prior to performing the editing operation corresponding to the received command on the selected image data items; and an editing unit constructed to perform the editing operation corresponding to the received command on the selected image data items, selectively, in accordance with the determination result by said determination unit, wherein said determination unit determines, when the command corresponding to a first editing operation is received by said receiving unit, that the instructed editing operation can be performed on image data items judged in the still image data format by said judging unit but cannot be performed on image data items judged in the moving image data format by said judging unit, while, when the command corresponding to the second editing operation is received by said receiving unit, the determination unit determines that the instructed editing operation can be performed on image data items judged in the moving image data format by said judging unit but cannot be performed on image data items judged in the still image data format by said judging unit, and said editing unit performs the instructed editing operation on image data items judged to be able to perform the instructed editing operation by said judging unit but does not perform the instructed editing operation on image data items judged to be unable to perform the instructed editing operation by said judging unit.

2. The apparatus according to claim 1, further comprising a notification unit constructed to notify said external apparatus via the network of a message when said determining unit has determined that the editing operation corresponding to the command is not executable for at least one image data item selected by said selection unit.

3. The apparatus according to claim 1, wherein the first editing operation includes at least one of rotating image data, enlarging/reducing a size of image data, adjusting an image quality of image data, and synthesizing image data, and the second editing operation includes at least one of halting voice playback of image data, and playing back image data in reverse.

4. A method of processing information by an information processing apparatus that stores a plurality of image data items and communicates with an external apparatus via a network, comprising:

a transmitting step of transmitting, to the external apparatus, screen information for displaying a plurality of images and a plurality of buttons on a screen of the external apparatus, the plurality of images including images represented by image data items in a still image data format and in a moving image data format, which images are displayed as a list of images with mixing the image data formats on the screen of the external apparatus, the plurality of buttons including a first button instructing to transmit a command for a first editing operation which can be performed on the image data items in the still image data format but cannot be performed on the image data items in the moving image data format or a second button instructing to transmit a command for a second editing operation which can be performed on the image data items in the moving image data format but cannot be performed on the image data items in the still image data format, wherein the first and second buttons are displayed as a list of buttons on the screen of the external apparatus;

a selection step of selecting image data items to be edited of the plurality of image data items stored in the information processing apparatus in response to an operation by a user for selecting images of the plurality of images displayed on the screen of the external apparatus, the selected image data items including image data items in the still image data format and in the moving image data format with mixing the image data formats;

a receiving step of receiving a command corresponding to a button pushed by the user in response to an operation by the user for pushing the button of the plurality of buttons displayed on the screen of the external apparatus;

a judging step of judging whether each of the selected image data items is in the still image data format or in the moving image data format;

a determination step of determining whether or not an editing operation corresponding to the received command can be performed to each of the selected image data items based on the judgment result by said judging step, prior to performing the editing operation corresponding to the received command on the selected image data items; and an editing step of performing an editing operation corresponding to the received command on the selected image data items, selectively, in accordance with the determination result by said determination step, wherein said determination step determines, when the command corresponding to the first editing operation is received by said receiving step, that the instructed editing operation can be performed on image data items judged in the still image data format by said judging step but cannot be performed on image data items judged in the moving image data format by said judging step, while, when the command corresponding to the second editing operation is received by said receiving step, the determination step determines that the instructed editing operation can be performed on image data items judged in the moving image data format by said judging step but cannot be performed on image data items judged in the still image data format by said judging step, and said editing step performs the instructed editing operation on image data items judged to be able to perform the instructed editing operation by said judging step but does not perform the instructed editing operation on image data items judged to be unable to perform the instructed editing operation by said judging step.

5. A computer-readable storage medium on which is stored a computer-executable program for executing a method of processing information by an information processing apparatus that stores a plurality of image data items and communicates with an external apparatus via a network, comprising:

a transmitting step of transmitting, to the external apparatus, screen information for displaying a plurality of images and a plurality of buttons on a screen of the external apparatus, the plurality of images including images represented by image data items in a still image data format and in a moving image data format, which images are displayed as a list of images with mixing the image data formats on the screen of the external apparatus, the plurality of buttons including a first button instructing to transmit a command for a first editing operation which can be performed on the image data items in the still image data format but cannot be performed on the image data items in the moving image data format or a second button instructing to transmit a command for a second editing operation which can be performed on the image data items in the moving image data format but cannot be performed on the image data items in the still image data format, wherein the first and second buttons are displayed as a list of buttons on the screen of the external apparatus;

a selection step of selecting image data items to be edited of the plurality of image data items stored in the information processing apparatus in response to an operation by a user for selecting images of the plurality of images displayed on the screen of the external apparatus, the selected image data items including image data items in the still image data format and in the moving image data format with mixing the image data formats;

a receiving step of receiving a command corresponding to a button pushed by the user in response to an operation by the user for pushing the button of the plurality of buttons displayed on the screen of the external apparatus;

a judging step of judging whether each of the selected image data items is in the still image data format or in the moving image data format;

a determination step of determining whether or not an editing operation corresponding to the received command can be performed to each of the selected image data items based on the judgment result by said judging step, prior to performing the editing operation corresponding to the received command on the selected image data items; and an editing step of editing operation corresponding to the received command on the selected image data items, selectively, in accordance with the determination result by said determination step, wherein said determination step determines, when the command corresponding to the first editing operation is received by said receiving step, that the instructed editing operation can be performed on image data items judged in the still image data format by said judging step but cannot be performed on image data items judged in the moving image data format by said judging step, while, when the command corresponding to the second editing operation is received by said receiving step, the determination step determines that the instructed editing operation can be performed on image data items judged in the moving image data format by said judging step but cannot be performed on image data items judged in the still image data format by said judging step, and said editing step performs the instructed editing operation on image data items judged to be able to perform the instructed editing operation by said judging step but does not perform the instructed editing operation on image data items judged to be unable to perform the instructed editing operation by said judging step.

* * * * *